United States Patent

[11] 3,604,694

[72] Inventor Adolf Muller
Pretzfeld, Germany
[21] Appl. No. 862,242
[22] Filed Sept. 30, 1969
[45] Patented Sept. 14, 1971
[73] Assignee Siemens Aktiengesellschaft
Berlin and Munich, Germany
[32] Priority Oct. 4, 1968
[33] Germany
[31] P 18 01 187.5

[54] DEVICE FOR HEAT TREATMENT OF SILICON DISCS
3 Claims, 2 Drawing Figs.

[52] U.S. Cl. 263/47, 148/188
[51] Int. Cl. F27b 21/04
[50] Field of Search 263/47 R, 48; 148/188

[56] References Cited

UNITED STATES PATENTS 3,183,130 5/1965 Reynolds et al. 263/47 X

*Primary Examiner*—John J. Camby
*Attorneys*—Curt M. Avery, Arthur E. Wilfond, Herbert L. Lerner and Daniel J. Tick

ABSTRACT: A device for heat treatment of silicon discs in an evacuable horizontal quartz tube. The silicon discs are arranged in stacks. A plurality of thin silicon rods arranged inside the quartz tube in mutually parallel relationship support the silicon discs.

DEVICE FOR HEAT TREATMENT OF SILICON DISCS

Figure 1:
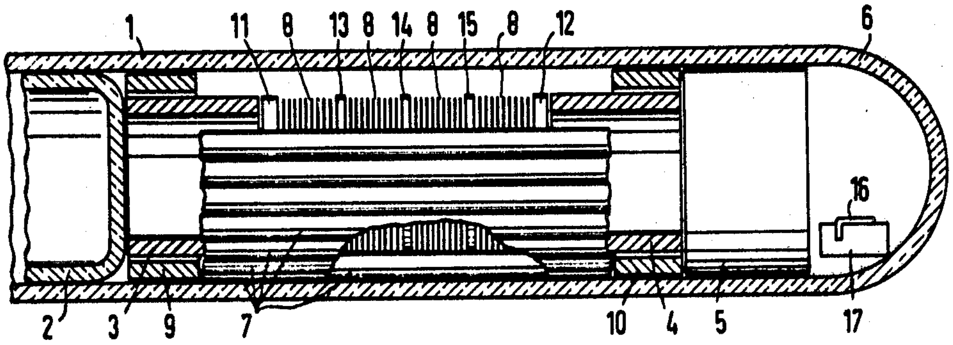

French Pat. No. 1,502,957 discloses a device for the heat treatment of silicon discs in a horizontal, evacuable quartz tube. The silicon wafers are arranged between support plates whose dimensions are larger than those of the silicon wafers. The support plates comprise a material whose thermal stability is higher than that of the vessel material which is comprised, for example, of silicon. The diameter of the support plates can be 2 to 4 mm. larger than the diameter of the silicon discs. The support plates serve to prevent during heat treatment, for example during a diffusion of about 1,200° C. parts of the quartz tube, softened through heat and deformed through atmospheric pressure, from pressing against the silicon discs thereby damaging the same.

It was discovered that the above device can to a large extent prevent the silicon discs to be treated from suffering mechanical damage. However, the silicon discs treated in the quartz tube frequently show accumulations of dislocations, following heat processing, which had not been present prior to said processing. These accumulations of dislocations start from the edge of the semiconductor body and extend more or less into the interior of the semiconductor body. Apparently, these accumulations of dislocations can be traced back to pressure tensions which are caused by the fact that one part of the periphery of the silicon discs bears directly against the quartz vessel, which causes the silicon to melt or alloy with the quartz at these contact places. Due to the different expansion coefficients of the quartz tube and of the silicon discs which are to be plastically deformed, stresses occur during the cooling process that lead to dislocations in the silicon discs.

It is the object of the invention to devise an apparatus for heat processing, particularly for doping the silicon discs, which will help to prevent, at a rise in temperature, the treated silicon discs from even partly contacting the wall of the doping vessel or other parts which have a different heat expansion coefficient than the silicon, during the coating process or subsequent thereto. Thus, the invention makes it possible for silicon discs which are free of or poor in dislocations, to remain the same following the heat treatment. The aforedescribed formation of nests of dislocations is to be particularly avoided.

The invention relates, therefore, to a device for the heat treatment of silicon discs in a horizontal quartz tube which can be evacuated, wherein the silicon discs are arranged in stacks. The invention is characterized by the fact that a plurality of thin silicon rods, positioned in mutually parallel relationship, are installed into the quartz tube where they serve as a support for the silicon discs. Firstly, the silicon rods prevent the silicon discs from contacting the quartz vessel with their lower edge portions. A quartz tube whose vessel is large relative to the diameter of the silicon discs, can also prevent the upper wall portion of the vessel from contacting, due to deformations, the unprotected edge portions of the silicon disc. Cylindrical end pieces can be provided for guiding the silicon rods in the quartz tube. This safeguards the mutually parallel position of the silicon rods which serve as bearings. Preferably, the outer diameter of the end pieces and the inner diameter of the quartz tube are so dimensioned that the silicon rods can freely move in peripheral direction of the quartz tube. The rolling positioning of the silicon rods, in the quartz tube, also ensures that the silicon discs always bear against the silicon rods, even if the quartz tube is turned around its middle axis by an arbitrary angle. When the number of silicon discs is selected, at a predetermined thickness of said rods, so that the latter cover at least the lower half of the inner diameter, a contact between the silicon discs and the quartz tube is impossible, even when the quartz tube is moved or turned in a sudden manner. The inner diameter of the quartz tube can be limited to a diameter only a few millimeters larger than the diameter of the silicon discs, provided that, according to a further development of the invention, support discs having a larger diameter than the silicon discs are arranged at least between the end pieces and the outermost silicon discs of the stack. When 10 or more silicon discs are treated, it is recommended to subdivide the stack one or several more times, by means of additional support discs.

Figure 2:
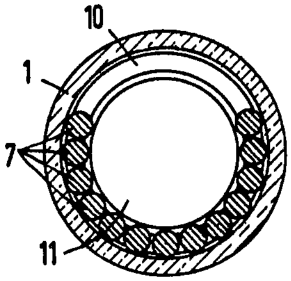

Other details and advantages of the invention will be shown in greater detail in an embodiment example, shown in the drawing, wherein:

FIG. 1 shows, in lateral view, partly in section, a device for heat treating silicon discs comprised for example of silicon, according to the invention; and FIG. 2 shows a section through the device according to FIG. 1.

FIG. 1 shows a doping vessel 1, which for example is a quartz tube. The quartz tube 1, which is evacuable, is sealed hermetically at its open end by a sealing cap 2 which can also be made of quartz. The interior of the quartz tube contains two cylindrical end pieces 3 and 4 which are protected against axial displacement, firstly by the sealing cap 2 and, secondly, by an additional quartz cylinder 5. The quartz cylinder is adjacent the curved portion 6 of the quartz tube 1. The end pieces 3 and 4 have a cylindrical thread which is used to guide thin silicon rods 7. The silicon rods 7 have a degree of purity which corresponds at least to that of the silicon discs 8 to be treated, that are stacked side by side. Their length is such that they are reliably guided by the cylindrical thread of the end pieces 3, 4. The end pieces 3 and 4 are respectively concentrically surrounded by an additional hollow cylinder 9 and 10. The latter serve as bearings for the silicon rods 7. The silicon rods 7 are of such thickness that they can freely move in the annular space, between the end pieces 3 and 4 and the inner wall of the quartz tube 8, in peripheral direction of the latter. Between the end pieces 3 and 4 and the outermost silicon discs of the stack, support discs 11 and 12 are situated, which are also comprised of silicon, which are at least as pure as the silicon discs 8 to be processed. The diameter of the support discs 11, 12 is a few millimeters larger than that of the silicon discs 8. Preferably, the support discs 11, 12 are also thicker than the silicon discs 8. It would be expedient to provide additional support discs 13 to 15 for a larger stack of silicon discs, in order to prevent a contacting of the upper wall portions, during the diffusion process. Such process can be carried out, for example, at approximately 1,200° C. A dopant source, such as an aluminum sheet 16, arranged in a carrier body 17, that can also comprise silicon, is at the end 6 of the quartz tube.

For a better understanding of the invention, the following embodiment example provides dimensions:

| | |
|---|---|
| Diameter of quartz tube | 55 mm. |
| Diameter of support plates | 34 mm. |
| Diameter of silicon wafers | 32 mm. |
| Diameter of silicon rods | 5 mm. |
| Number of silicon rods | 20 to 25 pieces |
| Distance thread of end pieces from inside wall of quartz tube | 7 mm. |

The device according to the invention is characterized by the fact that, with the exception of the quartz cylinder 1, all remaining parts of the device can be actually used for any desired number of heat treatments. The charging process is extremely simple. The device according to the invention is also suitable for other heat treatment processes, for example for gettering impurities.

I claim:

1. A device for heat treatment of silicon discs in an evacuable horizontal quartz tube, which comprises a quartz tube and a plurality of thin silicon rods inside said quartz tube, in mutually parallel relationship, to support the silicon discs arranged in stacks, cylindrical end pieces are provided in the quartz tube for guiding the silicon rods, and support plates, whose diameter is larger than that of the silicon discs, are arranged at least between the end pieces and the outer silicon discs of the stack.

2. The device of claim 1, wherein the outer diameter of the end pieces and the inner diameter of the quartz tube are such that the silicon rods can freely move, in peripheral direction of the quartz tube.

3. The device of claim 1 wherein the number and thickness of the silicon rods are such that they cover at least the lower half of the inner diameter of the quartz tube.